United States Patent [19]  [11] 4,260,671
Merrill  [45] Apr. 7, 1981

[54] POLYCARBONATE OVERCOATS AND BINDERS FOR PHOTOCONDUCTIVE LAYERS AND ELEMENTS

[75] Inventor: Stewart H. Merrill, Rochester, N.Y.

[73] Assignee: Eastman Kodak Company, Rochester, N.Y.

[21] Appl. No.: 92,887

[22] Filed: Nov. 9, 1979

[51] Int. Cl.³ .......................... G03G 5/14; G03G 5/04; G03G 5/05
[52] U.S. Cl. ......................................... 430/67; 430/96
[58] Field of Search ..................................... 430/67, 96

[56] References Cited

U.S. PATENT DOCUMENTS

T884,015  3/1971  Staudenmayer ..................... 430/96

3,595,650  7/1971  Holzinger et al. ................. 430/96 X

FOREIGN PATENT DOCUMENTS

| 563227 | 6/1958 | Belgium | 430/96 |
| 48-26783 | 8/1973 | Japan | 430/96 |
| 48-27932 | 8/1973 | Japan | 430/67 |
| 50-151152 | 12/1974 | Japan | 430/96 |
| 7400214 | 3/1974 | Netherlands | 430/67 |

*Primary Examiner*—Roland E. Martin, Jr.
*Attorney, Agent, or Firm*—Torger N. Dahl

[57] ABSTRACT

Photoconductive layers and elements and methods for their use are disclosed. The layers and elements include polycarbonate binders and overcoats having pendant polar groups.

37 Claims, No Drawings

POLYCARBONATE OVERCOATS AND BINDERS FOR PHOTOCONDUCTIVE LAYERS AND ELEMENTS

FIELD OF THE INVENTION

The invention relates to binders and protective overcoats for photoconductive layers and elements, and to methods for their use.

BACKGROUND OF THE INVENTION

Photoconductive layers which are useful in electrophotographic processes have been extensively described in the prior art. In general, a photoconductive layer comprises a photoconductor and a polymeric binder, and in some applications an overcoat is superposed on the photoconductive layer to provide increased resistance to solvents and abrasion.

Polycarbonates, such as those formed by condensation of isopropylidenediphenol with phosgene, have been used as binders for photoconductive layers. Such utility is described, for example, in Canadian Pat. No. 601,228, issued July 5, 1960 and in U.S. Defensive Publication No. T884,015. However, polycarbonates such as those described in these publications result in photoconductive layers which exhibit less than desirable adhesion, abrasion-resistance, and solvent-resistance.

SUMMARY OF THE INVENTION

The present invention provides binders and overcoats for photoconductive layers and elements. The binders and overcoats comprise polycarbonates having pendant polar groups on about 1 to 100 percent of the polycarbonates' recurring units. Preferred pendant polar groups are selected from the group consisting of amide, sulfonamide, carboxyl, hydroxyl, and lactone.

When such polycarbonates are used as binders for photoconductive layers, the layers exhibit improved adhesion and improved resistance to solvents and abrasion compared to photoconductive layers described in the prior art. These are highly desirable properties for electrophotographic elements which are subjected to repeated use.

The pendant polar groups provide cross-linking sites through which the polycarbonates can be cross-linked by using a suitable cross-linking agent. Photoconductive layers containing binders comprising such cross-linked polycarbonates have even more improved properties of adhesion and resistance to abrasion and solvents than do the already improved photoconductive layers which contain the uncross-linked polycarbonate binders.

Improved resistance to solvents and abrasion can also be provided by using such uncrosslinked or cross-linked polycarbonates as protective overcoats superposed on photoconductive layers of electrophotographic elements. Such overcoats exhibit better adhesion and better resistance to solvents and abrasion than overcoats described in the prior art.

In general, polar groups tend to increase the conductivity of photoconductive layers when associated therewith, especially in conditions of high humidity, and result in undesirable high dark decay (premature dissipation of electrostatic charge). It was, therefore, surprising to find that the polycarbonates of the present invention, when used as binders and/or overcoats, do not adversely increase the conductivity of photoconductive layers, i.e., when the polycarbonates are used, according to the invention, as binders and/or overcoats for photoconductive layers, the layers still operate fully satisfactorily in electrophotographic processes.

DESCRIPTION OF THE PREFERRED EMBODIMENTS

A preferred photoconductive layer according to the invention comprises a photoconductor and a binder. The binder is a polycarbonate binder, and/or the photoconductive layer has a polycarbonate overcoat superposed thereon. Useful polycarbonates have from about 1 to 100 percent recurring units represented by the structural formula

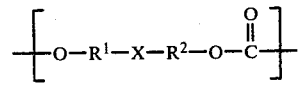

wherein $R^1$ and $R^2$, which are the same or different, are arylene, or $R^1$ is

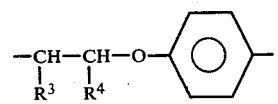

and $R^2$ is

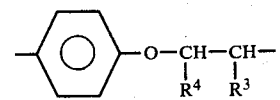

wherein $R^3$ and $R^4$ are both hydrogen, or one of $R^3$ and $R^4$ is hydrogen and the other is methyl; and X is selected from the group consisting of:

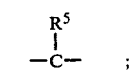

a.

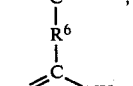

b.

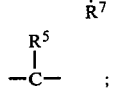

c.

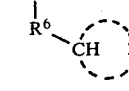

d.

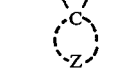

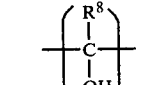

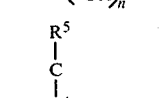

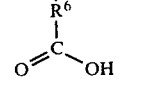

e.

; and

-continued f.
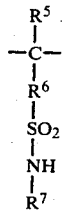

wherein:

R⁵ is hydrogen, aryl, or alkyl having from 1 to 6 carbon atoms;

R⁶ is arylene or alkylene having from 1 to 10 carbon atoms;

R⁷ is hydrogen or alkyl having from 1 to 6 carbon atoms;

R⁸ is alkyl having from 1 to 4 carbon atoms;

Z represents the atoms necessary to complete a lactone; and n is an integer from 1 to 2.

Polycarbonates having polar groups attached to from 5 to 50 percent of the recurring units thereof are especially useful.

As used herein, the term "polar group" means a chemical moiety which exhibits polar characteristics when pendantly attached to a polycarbonate and which provides a site for cross-linking to a similar polar group on another polycarbonate by using an aminoplast resin, formaldehyde, or a dialdehyde as the cross-linking agent. Preferred polar groups include amide, sulfonamide, hydroxyl, carboxyl and lactone groups, but are not limited thereto.

Optionally, the polycarbonates can also contain, in addition to the recurring units described above, recurring units having the structural formula

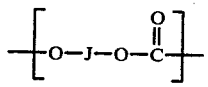

wherein J is selected from the group consisting of:

arylene, aralkylene, or alkylene having from 1-20 carbon atoms; (1)

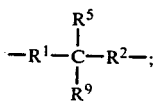 (2)

—R¹—O—R²—; (3)

—R¹—S—R²—; (4)

—R¹—SO₂—R²—; and (5)

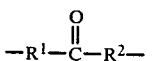 (6)

wherein R¹, R², and R⁵ are as described above, and R⁹ is the same as R⁵, or R⁵ and R⁹ together form a carbocyclic ring. Such recurring units are non-essential but may comprise from 0 to 99 percent of the recurring units of the polycarbonates of the invention.

Some respective polycarbonates useful in the present invention are listed in Table I.

TABLE I

| | Representative Polycarbonates |
|---|---|
| I. | poly[4,4'-isopropylidenediphenylene-co-4,4'-(1-carbamoylethylidene)diphenylene carbonate] (mole ratio 90:10) |
| II. | poly(4,4'-isopropylidenediphenylene-co-4,4'-[1-(2-carbamoylethyl)ethylidene]diphenylene carbonate) (mole ratio 92:8) |
| III. | poly(4,4'-isopropylidenediphenylene-co-4,4'-[1-(2-[N-methyl]carbamoylethyl)ethylidene]-diphenylene carbonate) (mole ratio 80:20) |
| IV. | poly(4,4'-isopropylidenediphenylene-co-4,4'-[1-(5,5-dimethyltetrahydrofuran-2-one-4-yl)-ethylidene]diphenylene carbonate) (mole ratio 90:10) |
| V. | poly(4,4'-isopropylidenediphenylene-co-4,4'-phthalidylidene carbonate) (mole ratio 90:10) |
| VI. | poly(4,4'-isopropylidenediphenylene-co-1,2-diethyl-1,2-dihydroxyethylene-1,2-di-p-phenylene carbonate) (mole ratio 90:10) |

The polycarbonates heretofore described as useful binders and/or overcoats for photoconductive layers and electrophotographic elements of the invention are known compounds and may be prepared by any of the known methods of polycarbonate preparation, such as by the condensation of bisphenols with phosgene. The preparation of polycarbonates is described in a number of patents, including Belgian Pat. Nos. 546,766; 553,614; 546,377; 555,894; and 809,735; French Pat. No. 1,152,155; and Canadian Pat. No. 887,020.

Typically, the polycarbonate material when used as a binder component is present in the photoconductive layers of the invention in an amount from about 10% to about 85% by weight based on the total dry weight of the photoconductive layer. When used as an overcoat, the polycarbonate usually comprises 100% of the overcoat layer, although in some cases it may be found advantageous to include other materials also.

Useful photoconductors are chosen from a wide variety of organic, organo-metallic, or inorganic photoconductive materials. In general, photoconductive layers employed in the present invention contain an amount of photoconductor equal to at least about 1 weight percent based on the total weight of the photoconductive layer. The upper limit in the amount of photoconductor present in a particular photoconductive layer can be widely varied depending, for example, upon the sensitivity of the specific photoconductor under consideration, its compatibility with the polycarbonate binder component, and the like.

A variety of photoconductors are well known in the art. Such photoconductors include aggregate photoconductors as disclosed by Light in U.S. Pat. No. 3,615,414 and Gramza et al in U.S. Pat. No. 3,615,396, zinc oxide, lead oxide, selenium, various particulate organic pigment materials such as phthalocyanine pigments, and a wide variety of well-known organic compounds including metallo-organic and homo-geneous polymeric organic photoconductors. A partial listing of representative photoconductors may be found, for example, in *Research Disclosure*, Vol. 109, May 1973, page 61, in an article entitled "Electrophotographic Elements, Materials and Processes", at paragraph IV(A) thereof. This partial listing of well-known photoconductors is hereby incorporated herein by reference.

In general, the photoconductive layers of the present invention are prepared by methods well known in the art of electrophotography, e.g., by blending a dispersion or solution of the photoconductor together with a binder comprising a polycarbonate having pendant polar groups as described hereinabove and coating or otherwise forming a layer of such photoconductive composition. Such photoconductive layers have a uniform thickness after drying of from 1 to 500 microns. However, in preferred embodiments of the present invention, such as those illustrated in the Examples following this Description, dry thickness should be from about 5 to about 15 microns. Dry thicknesses from about 6 to about 12 microns are especially preferred.

Similarly, overcoats of the present invention are prepared by coating a solution or dispersion of the polycarbonate of choice, or otherwise forming a layer of the polycarbonate, on top of the photoconductive layer of an electrophotographic element (including photoconductive layers provided by the present invention). Overcoat thickness is not critical and can be chosen in accordance with the degree of protection required. Generally, the dry thickness of the overcoat will be from about 0.07 to about 15 microns.

Optionally, various sensitizing materials such as spectral sensitizing dyes and chemical sensitizers may also be incorporated in the photoconductive layers. Where a sensitizing compound is employed in a photoconductive layer of the present invention, it is desirable to mix a suitable amount of the sensitizing compound with the photoconductive composition so that, after thorough mixing and coating, the sensitizing compound is uniformly distributed in the photoconductive layer.

Various coating vehicles for preparing overcoats and photoconductive layers useful in the present invention include a variety of well-known solvent materials. Generally, volatile organic solvents have been found quite effective. Representative such solvents include: (1) halogenated aliphatic hydrocarbons such as methylene chloride, chloroform, ethylene chloride; (2) cyclic ethers such as tetrahydrofuran; and (3) mixtures of the foregoing.

The overcoats and photoconductive layers of the present invention are in most electrophotographic elements. Such elements comprise a photoconductive layer superposed on and in electrical contact with an electrically conductive support. The overcoat, when used, is superposed on the photoconductive layer. Electrically conductive layers include supports, such as paper, cellulose acetate, cellulose nitrate, polystyrene or poly(ethylene terephthalate) having a conductive substrate thereon. An especially useful conducting support can be prepared by coating a transparent film support material with a layer containing a semi-conductor such as cuprous iodide dispersed in a resin. Suitable conducting coatings also can be prepared from the sodium salt of a carboxyester lactone of maleic anhydride-vinyl acetate copolymer. Useful conducting layers and methods for their preparation are disclosed, for example, in Minsk U.S. Pat. No. 3,007,901 issued Nov. 7, 1961; Trevoy U.S. Pat. No. 3,245,833, issued Apr. 12, 1966; and Sterman et al U.S. Pat. No. 3,262,807, issued July 26, 1966.

Methods of preparation of electrophotographic elements are well known in the art. Generally, the electrically conductive layer will be prepared as described above and then the photoconductive layer (and then the overcoat, of any) will be coated directly on the conductive support from a dispersion or solution of the photoconductive composition. The overcoat is similarly coated over the photoconductive layer.

As stated previously, the uncross-linked polycarbonates useful in the practice of this invention can be cross-linked through the pendant polar groups with an appropriate cross-linking agent to yield even more-improved adhesive, solvent-resistant, and abrasion-resistant properties. A suitable amount of the cross-linking agent is included in the coating composition for the overcoat and/or the coating composition for the photoconductor and polycarbonate binder. After coating, as described above, the layer is then heated until sufficiently cross-linked. An acid, such as p-toluenesulfonic acid can, optionally, be used to accelerate the cross-linking.

Suitable cross-linking agents include aminoplast resins, formaldehyde and dialdehydes, such as methoxymelamine resin or formaldehyde. Further discussion of cross-linking agents and methods of cross-linking can be found in the Examples below and in *Research Disclosure*, publication No. 10923, Vol. 109, May 1973, at page 68.

Electrophotographic elements containing a photoconductive layer and/or a protective overcoat according to this invention are useful in electrophotographic imaging processes. Such a process involves electrostatically charging the element by any of the well known charging means such as corona discharge, alpha particle emission, or electrostatic induction, as described, for example, in Schaffert, R. M., *Electrophotography*, London, Focal Press Ltd., 1966. p. 25–26, 65-18644. The element is then exposed to a visual image. Those portions of the element which are illuminated become more conductive, allowing the charge in those illuminated portions of the layer to dissipate. An electrostatic latent image is thus created by the pattern of charged and uncharged areas. This latent image is developed by contacting the element with a toner composition having a positive or negative charge. The toner composition adheres to surface areas of the layer which are charged or uncharged, depending upon the polarity of the toner composition used to form a visible image. The toner-defined visible image can then be fixed in place by application of heat or pressure or both. Usually, the developed image is transferred to another surface such as a sheet of paper, where it is similarly fixed in place.

The following examples are provided to further illustrate the preparation, use, and properties of some preferred embodiments of the invention.

The specific polycarbonates employed in the examples are referred to by Roman numerals as listed in Table I.

EXAMPLE 1: Cross-Linking the Polycarbonates

This example describes methods of cross-linking polycarbonates useful in the invention and demonstrates the good solvent resistance and good adhesion of layers containing such cross-linked polycarbonates.

Polymer I with formaldehyde

To a 5% solution of Polymer I in tetrahydrofuran was added 15% formaldehyde and 5% p-toluenesulfonic acid, based on the weight of the polymer. A 40% aqueous solution of formaldehyde was used. This solution was coated on glass and dried. A portion of the coating was heated (cross-linked) in an oven at 90° C. It was insoluble in chloroform after 30 minutes of heating. Another portion was heated at 40° C.; it became insoluble in chloroform in 2½ hours. A coating of Polymer I containing 4% formaldehyde and 0.2% p-toluenesulfonic acid also was insoluble in chloroform after 30 minutes heating at 90° C.

For purposes of comparison a polycarbonate made from 100% 4,4'-isopropylidenediphenol was coated with formaldehyde and p-toluenesulfonic acid and was found to be still soluble in chloroform after 30 minutes heating at 90° C.

Polymer II with methoxymelamine resin

To a 5% solution of Polymer II in ethylene chloride was added 5% (based on solids) of Uformite MM-83 (a methoxymethylmelamine resin, 80% solids, made by Rohm and Haas). This solution was coated on glass, dried, and heated (crosslinked) for 30 minutes at 120° C. The coating was insoluble in ethylene chloride and had good adhesion to glass.

Polymer III with methoxymelamine resin

Polymer III and Uformite MM-83, 12% based on solids, were coated and heated at 120° as described above. After 30 minutes heating, the coating was insoluble in ethylene chloride and adhered well to glass.

Polymer III with urea-formaldehyde resin

To a 10% solution of Polymer III in ethylene chloride was added 10% (based on solids) of Uformite F-240 (a urea-formaldehyde resin, 60% solids, made by Rohm and Haas). This solution was coated on glass, dried and heated in an oven. Within 30 minutes it was insoluble in ethylene chloride and its adhesion to glass was excellent. When a polycarbonate made from 100%, 4,4'-isopropylidenediphenol was similarly heated with Uformite F-240 it remained soluble and its adhesion to glass was poor.

Polymers IV, V, and VI were similarly cross-linked through melamine-formaldehyde resin. Coatings on glass were made from a 10% solution of polymer in ethylene chloride containing 12%, based on solids, of Uformite MM-83. The coatings were dried and cross-linked by heating at 120° C. for 30 minutes. In each case the resulting coatings were insoluble in chloroform and adhesion to glass was very good.

The relative speed measurements reported in Examples 2 and 3 are relative H & D electrical speeds. The relative H & D electrical speeds measure the speed of a given photoconductive material relative to other materials typically within the same test group of materials. The relative speed values are not absolute speed values. However, relative speed values are related to absolute speed values. The relative electrical speed (shoulder or toe speed) is obtained simply by arbitrarily assigning a value, Ro, to one particular photoconductive material. The relative shoulder or toe speed, Rn, of any other photoconductive material, n, relative to this value, Ro, may then be calculated as follows: $R_n = (A_n)(R_o/A_o)$ wherein $A_n$ is the absolute electrical speed of the first material. The absolute H & D electrical speed, either the shoulder or toe speed, of a material may be determined as follows: The material is electrostatically charged under, for example, a corona source until the surface potential, as measured by an electrometer probe, has an initial value $V_o$, of about 600 volts. The charged element is then exposed to a 3000° K. tungsten light source through a stepped density gray scale. The exposure causes reduction of the surface potential of the element under each step of the gray scale from its initial potential $V_o$ to some lower potential V the exact value of which depends upon the amount of exposure in meter-candle-seconds received by the area. The results of these measurements are then plotted on a graph of surface potential V vs. log exposure for each step, thereby forming an electrical characteristic curve. The electrical or electrophotographic speed of the photoconductive composition can then be expressed in terms of the reciprocal of the exposure required to reduce the surface potential to any fixed selected value. An apparatus useful for determining the electrophotographic speeds of photoconductive compositions is described in Robinson et al, U.S. Pat. No. 3,449,658, issued June 10, 1969.

EXAMPLE 2: Non-Deleterious Effects of Uncross-linked Polycarbonates with Pendant Polar Groups on the Electrical Speed of Photoconductive Layers Five different polycarbonates having pendant polar groups were tested as binders for homogeneous organic photoconductive elements by combining the uncross-linked polycarbonate with 20% by weight of 4,4'-bis(-diethylamino)-2,2'-dimethyltriphenylmethane, and 1% by weight of 2,4-bis(4-ethoxyphenyl)-6-(4-amyloxystyryl)-pyrylium fluoroborate and forming a layer as described previously. After drying, the thickness of the layer was approximately 7 microns.

For comparison purposes a Control, poly(4,4'-isopropylidenediphenylene carbonate) (100% Bisphenol-A condensed with phosgene and having no pendant polar groups), was used as the binder in one of the formulations. The relative speeds at two points (shoulder and toe) of each of the photoconductive elements were compared when charged positively and negatively.

The results shown below in Table II indicate that the polymers with pendant polar groups had no significant deleterious effects on the function of the photoconductive elements when compared with the Control. The slight speed decreases for photoconductive layers containing Polymers I, II, and IV, respectively, are not considered to be significant. In many instances the shoulder and toe speeds actually increased.

TABLE II

| Speed Comparison of Photoconductive Composition | | |
|---|---|---|
| Binder (uncross-linked) | Relative Speed (Shoulder/Toe) | |
| | ⊕ Charge | ⊖ Charge |
| Control | 1310/100** | 1371/100** |
| Polymer I | 1190/95 | 1800/114 |
| Polymer II | 1333/81 | 1571/91 |
| Polymer IV | 1333/95 | 1800/103 |
| Polymer V | 1500/100 | 1800/114 |
| Polymer VI | 1333/107 | 1800/114 |

**Assigned an arbitrary speed value of 100 in each column.

EXAMPLE 3: Properties and Non-Deleterious Effects of Cross-Linked and Uncross-Linked Binders Relative speeds were measured as in Example 2 for 2 samples, A and B. Sample A was a 7 micron-thick photoconductive layer with Polymer I as the uncross-linked binder, 25% by weight of 4-diphenylaminocinnamic acid as the photoconductor, and 1% by weight of 2,6-bis-p-ethoxyphenyl-4-p-N-amyloxyphenyl thiopyrylium perchlorate as the sensitizer. Sample B was the same as Sample A, except that 15% by weight of the Sample B photoconductive layer comprised Uformite MM-83 as a cross-linking agent. Sample B was cross-linked by heating for 30 minutes at 120° C.

The results in Table III show no significant deleterious effects on the electrical speed of the photoconductive layer containing cross-linked binder as compared to the layer containing uncross linked binder. Indeed, the shoulder speeds actually increased in the cross-linked photoconductive layer. Both the cross-linked and uncross linked samples exhibited good adhesion to a conductive film support, and the abrasion resistance of both samples was good.

TABLE III

Speed Comparison of Photoconductive Layers with Cross-Linked and Uncross-Linked Binder

| Photoconductive Layer | Relative Speed (Shoulder/Toe) | |
|---|---|---|
| | ⊕ Charge | ⊖ Charge |
| Sample A | 788/100* | 563/38 |
| Sample B (cross-linked) | 1125/63 | 788/20 |

*Assigned an arbitrary speed value of 100.

EXAMPLE 4: Abrasion-Resistance of Cross-Linked Polycarbonates

Polymer III was dissolved in a solvent blend of 60% dichloromethane and 40% 1,1,2-trichloroethane, and to it was added 17.6% (total solids) of Cymel 370, a melamineformaldehyde resin from American Cyanamide used as a cross-linking agent. The dope was coated at a temperature of 18° C. on a piece of polyethylene terephthalate support subbed with a terpolymer of 2 weight percent itaconic acid, 15 weight percent methylacrylate, and 83 weight percent vinylidene chloride. The resulting film was cross-linked by heating at 130° C. for 30 minutes. The final thickness of the polycarbonate layer was determined to be 12.5 microns.

The film's abrasion resistance was compared with that of films prepared from other polymers not within the scope of this invention. Samples of the films were spliced into a belt. In the apparatus used to test abrasion resistance, the belt was placed on a drum and rotated in contact with a magnetic development brush and fur brush cleaning station. The magnetic brush was biased to continuously lay down a layer of toner on the belt, which was continuously removed at the cleaning station. The action of this apparatus duplicates the film wear observed in electrophotographic copiers.

The results of this test, shown in Table IV, indicate that cross-linked Polymer III is worn away at a much slower rate than the other materials.

It follows logically from this Example and the preceding Examples that photoconductive layers employing such a polycarbonate as a binder or protective overcoat will be fully operable, yet much more resistant to solvents and to wear caused by abrasion than the photoconductive layers and elements described in the prior art.

TABLE IV

Improved Abrasion Resistance In Layers Provided By The Invention

| Polymer Layer | Wear (micron*) |
|---|---|
| Polymer III (of the invention) | 1 |
| Poly(t-butylstyrene) | 21 |
| Poly(t-butyl methacrylate) | 16 |
| Poly(isopropyl methacrylate) | 12 |
| Polystyrene | 8 |
| Estane 5707F-1 (A polyurethane marketed by B.F. Goodrich Co.) | 6 |
| Poly(methyl methacrylate-co-vinylcarbazole) 78/22 | 4 |

*Wear is expressed as the number of microns of layer worn away for each of the above polymer layers after the same number of imaging cycles.

The invention has been described in detail with reference to particular preferred embodiments thereof, but it will be understood that modifications and variations can be effected within the spirit and scope of the invention.

What is claimed is:

1. A photoconductive layer comprising a photoconductor and a polycarbonate binder having pendant polar groups attached to from about 1 to 100 percent of the recurring units of said polycarbonate.

2. The photoconductive layer of claim 1, wherein said pendant polar groups are selected from the group consisting of amide, sulfonamide, carboxyl, hydroxyl, and lactone.

3. A photoconductive layer comprising a photoconductor and a polycarbonate binder wherein from about 1 to 100 percent of the recurring units of said polycarbonate are represented by the structural formula $$\left[ -O-R^1-X-R^2-O-\overset{O}{\underset{\|}{C}}- \right]$$

wherein $R^1$ and $R^2$, which are the same or different, are both arylene, or $R^1$ is

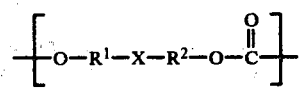

and $R^2$ is

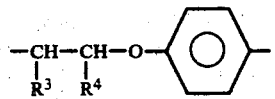

wherein $R^3$ and $R^4$ are both hydrogen, or one of $R^3$ and $R^4$ is hydrogen and the other is methyl; and X is selected from the group consisting of:

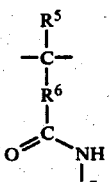
a.

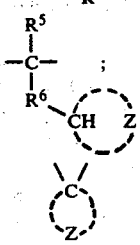
b.

c.

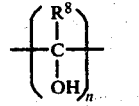
d.

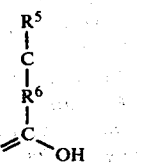
; and
e.

-continued

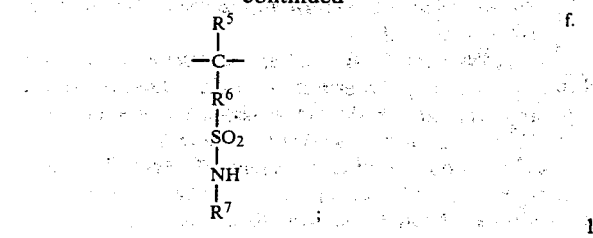

wherein:
R$^5$ is hydrogen, aryl, or alkyl having from 1 to 6 carbon atoms;
R$^6$ is arylene or alkylene having from 1 to 10 carbon atoms;
R$^7$ is hydrogen or alkyl having from 1 to 6 carbon atoms;
R$^8$ is alkyl having from 1 to 4 carbon atoms;
Z represents the atoms necessary to complete a lactone; and
n is an integer from 1 to 2.

4. A photoconductive layer comprising a photoconductor and a polycarbonate binder selected from the group consisting of:
   a. poly[4,4'-isopropylidenediphenylene-co-4,4'-(1-carbamoylethylidene)diphenylene carbonate];
   b. poly(4,4'-isopropylidenediphenylene-co-4,4'-[1-(2-carbamoylethyl)ethylidene]diphenylene carbonate);
   c. poly(4,4'-isopropylidenediphenylene-co-4,4'-[1-(2-[N-methyl]carbamoylethyl)ethylidene]-diphenylene carbonate);
   d. poly(4,4'-isopropylidenediphenylene-co-4,4'-[1-(5,5-dimethyltetrahydrofuran-2-one-4-yl)ethylidene]diphenylene carbonate);
   e. poly(4,4'-isopropylidenediphenylene-co-4,4'-phthalidylidene carbonate); and
   f. poly(4,4'-isopropylidenediphenylene-co-1,2-diethyl-1,2-dihydroxyethylene-1,2-di-p-phenylene carbonate.

5. The photoconductive layer of claims 1, 3 or 4, wherein pendant polar groups are attached to from 5 to 50 percent of the recurring units of said polycarbonate.

6. The photoconductive layer of claims 1, 3 or 4 wherein pendant polar groups are attached to from 8 to 20 percent of the recurring units of said polycarbonate.

7. The photoconductive layer of claims 1, 3 or 4 wherein said polycarbonate is cross-linked through its pendant polar groups.

8. The photoconductive layer of claim 7, wherein said polycarbonate is cross-linked through its pendant polar groups with a cross-linking agent selected from the group consisting of aminoplast resins, formaldehydes, and dialdehydes.

9. The photoconductive layer of claims 1, 3 or 4 wherein said photoconductive layer is an aggregate photoconductive layer.

10. The photoconductive layer of claims 1, 3 or 4 wherein said photoconductive layer is an organic photoconductive layer.

11. The organic photoconductive layer of claim 10 wherein said organic photoconductive layer is a homogeneous organic photoconductive layer.

12. An electrophotographic element comprising an electrically conductive layer in electrical contact with a photoconductive layer which comprises a photoconductor and a polycarbonate binder having pendant polar groups attached to from about 1 to 100 percent of the recurring units of said polycarbonate.

13. The electrophotographic element of claim 12 wherein said pendant polar groups are selected from the group consisting of amide, sulfonamide, carboxyl, hydroxyl and lactone.

14. An electrophotographic element comprising an electrically conductive layer in electrical contact with a photoconductive layer which comprises a photoconductor and a polycarbonate binder wherein from about 1 to 100 percent of the recurring units of said polycarbonate are represented by the structural formula $$\left[ O-R^1-X-R^2-O-\overset{\overset{O}{\|}}{C} \right]$$

wherein R$^1$ and R$^2$, which are the same or different, are both arylene, or R$^1$ is

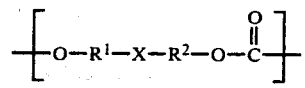

and R$^2$ is

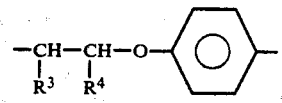

wherein R$^3$ and R$^4$ are both hydrogen, or one of R$^3$ and R$^4$ is hydrogen and the other is methyl; and X is selected from the group consisting of:

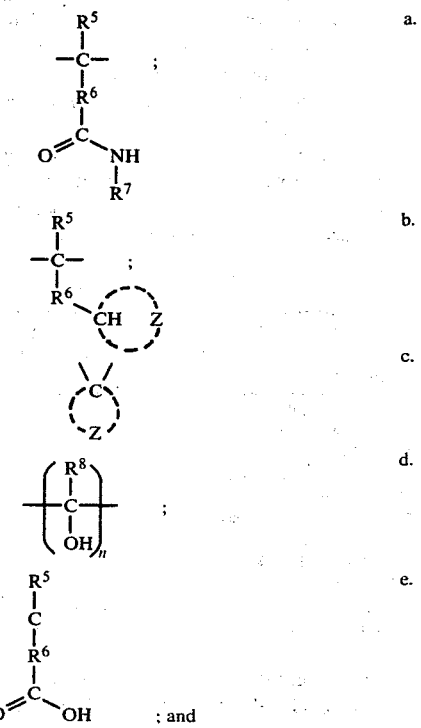

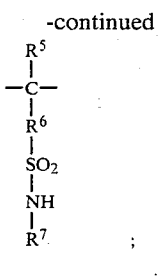

wherein:

R⁵ is hydrogen, aryl, or alkyl having from 1 to 6 carbon atoms;

R⁶ is arylene or alkylene having from 1 to 10 carbon atoms;

R⁷ is hydrogen or alkyl having from 1 to 6 carbon atoms;

R⁸ is alkyl having from 1 to 4 carbon atoms;

Z represents the atoms necessary to complete a lactone; and n is an integer from 1 to 2.

15. An electrophotographic element comprising an electrically conductive layer in electrical contact with a photoconductive layer comprising a photoconductor and a polycarbonate binder selected from the group consisting of:
   a. poly[4,4'-isopropylidenediphenylene-co-4,4'-(1-carbamoylethylidene)diphenylene carbonate];
   b. poly(4,4'-isopropylidenediphenylene-co-4,4'-[1-(2-carbamoylethyl)ethylidene]diphenylene carbonate);
   c. poly(4,4'-isopropylidenediphenylene-co-4,4'-[1-(2-[N-methyl]carbamoylethyl)ethylidene]diphenylene carbonate);
   d. poly(4,4'-isopropylidenediphenylene-co-4,4'-[1-(5,5-dimethyltetrahydrofuran-2-one-4-yl)-ethylidene]diphenylene carbonate);
   e. poly(4,4'-isopropylidenediphenylene-co-4,4'-phthalidylidene carbonate); and
   f. poly(4,4'-isopropylidenediphenylene-co-1,2-diethyl-1,2-dihydroxyethylene-1,2-di-p-phenylene carbonate).

16. The electrophotographic element of claims 12, 14 or 15, wherein said polycarbonate is cross-linked through its pendant polar groups.

17. The electrophotographic element of claim 16, wherein said polycarbonate is cross-linked through its pendant polar groups with a cross-linking agent selected from the group consisting of aminoplast resins, formaldehydes, and dialdehydes.

18. The electrophotographic element of claims 12, 14 or 15 wherein pendant polar groups are attached to from 5 to 50 percent of the recurring units of said polycarbonate.

19. An electrophotographic element comprising:
a. an electrically conductive layer;
b. a photoconductive layer superposed on and in electrical contact with said electrically conductive layer; and
c. an overcoat superposed on said photoconductive layer, said overcoat comprising a polycarbonate having pendant polar groups attached to from about 1 to 100 percent of the recurring units of said polycarbonate.

20. The electrophotographic element of claim 19 wherein said polycarbonate overcoat is cross-linked through its pendant polar groups.

21. The electrophotographic element of claim 19 wherein said polycarbonate overcoat is cross-linked through its pendant polar groups with a cross-linking agent selected from the group consisting of aminoplast resins, formaldehydes, and dialdehydes.

22. An electrophotographic element comprising:
a. an electrically conductive layer;
b. a photoconductive layer as described in claims 1, 2, 3, or 4 superposed on and in electrical contact with said electrically conductive layer; and
c. an overcoat superposed on said photoconductive layer, said overcoat comprising a polycarbonate having pendant polar groups attached to from about 1 to 100 percent of the recurring units of said polycarbonate.

23. An electrophotographic element comprising:
a. an electrically conductive layer;
b. a photoconductive layer superposed on and in electrical contact with said electrically conductive layer; and
c. an overcoat superposed on said photoconductive layer, said overcoat comprising a polycarbonate having pendant polar groups attached to from about 1 to 100 percent of the recurring units of said polycarbonate, said pendant polar groups being selected from the group consisting of amide, sulfonamide, carboxyl, hydroxyl, and lactone.

24. The electrophotographic element of claim 23 wherein said polycarbonate overcoat is cross-linked through its pendant polar groups.

25. The electrophotographic element of claim 23 wherein said polycarbonate overcoat is cross-linked through its pendant polar groups with a cross-linking agent selected from the group consisting of aminoplast resins, formaldehydes, and dialdehydes.

26. An electrophotographic element comprising:
a. an electrically conductive layer;
b. a photoconductive layer as described in claims 1, 2, 3, or 4 superposed on and in electrical contact with said electrically conductive layer; and
c. an overcoat superposed on said photoconductive layer, said overcoat comprising a polycarbonate having pendant polar groups attached to from about 1 to 100 percent of the recurring units of said polycarbonate, said pendant polar groups being selected from the group consisting of amide, sulfonamide, carboxyl, hydroxyl, and lactone.

27. An electrophotographic element comprising:
a. an electrically conductive layer;
b. a photoconductive layer superposed on and in electrical contact with said electrically conductive layer; and
c. an overcoat superposed on said photoconductive layer, said overcoat comprising a polycarbonate wherein from about 1 to 100 percent of the recurring units of said polycarbonate are represented by the structural formula

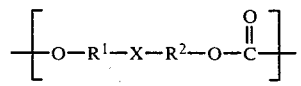

wherein R¹ and R², which are the same or different are both arylene, or R¹ is

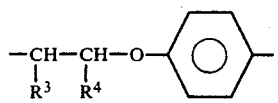

and R² is

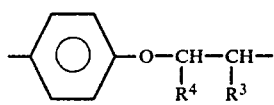

wherein R³ and R⁴ are both hydrogen, or one of R³ and R⁴ is hydrogen and the other is methyl; and X is selected from the group consisting of:

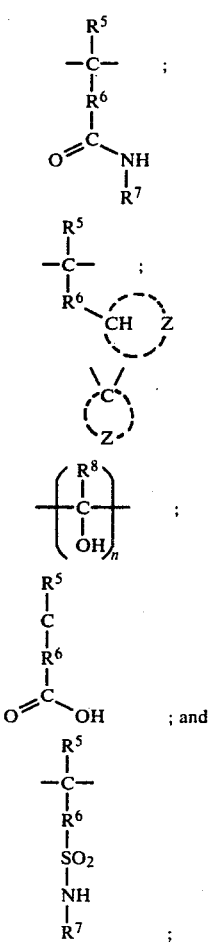

wherein:
R⁵ is hydrogen, aryl, or alkyl having from 1 to 6 carbon atoms;
R⁶ is arylene or alkylene having from 1 to 10 carbon atoms;
R⁷ is hydrogen or alkyl having from 1 to 6 carbon atoms;
R⁸ is alkyl having from 1 to 4 carbon atoms;
Z represents the atoms necessary to complete a lactone; and
n is an integer from 1 to 2.

28. The electrophotographic element of claim 27 wherein said polycarbonate overcoat is cross-linked through its pendant polar groups.

29. The electrophotographic element of claim 27 wherein said polycarbonate overcoat is cross-linked through its pendant polar groups with a cross-linking agent selected from the group consisting of aminoplast resins, formaldehydes, and dialdehydes.

30. An electrophotographic element comprising:
a. an electrically conductive layer;
b. a photoconductive layer as described in claims 1, 2, 3, or 4 superposed on and in electrical contact with said electrically conductive layer; and
c. an overcoat superposed on said photoconductive layer, said overcoat comprising a polycarbonate wherein from about 1 to 100 percent of the recurring units of said polycarbonate are represented by the structural formula

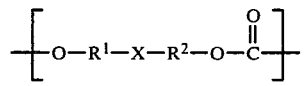

wherein R¹ and R², which may be the same or different, are arylene, or R¹ is

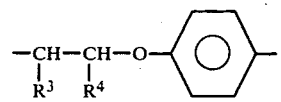

and R² is

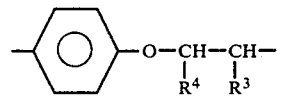

wherein R³ and R⁴ are both hydrogen, or one of R³ and R⁴ is hydrogen and the other is methyl; and X is selected from the group consisting of:

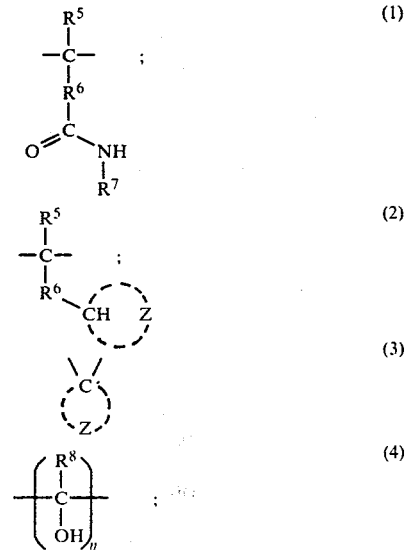

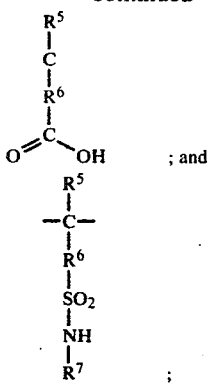

wherein:

R⁵ is hydrogen, aryl, or alkyl having from 1 to 6 carbon atoms;

R⁶ is arylene or alkylene having from 1 to 10 carbon atoms;

R⁷ is hydrogen or alkyl having from 1 to 6 carbon atoms;

R⁸ is alkyl having from 1 to 4 carbon atoms;

Z represents the atoms necessary to complete a lactone; and n is an integer from 1 to 2.

31. An electrophotographic element comprising:
a. an electrically conductive layer;
b. a photoconductive layer superposed on and in electrical contact with said electrically conductive layer; and
c. an overcoat superposed on said photoconductive layer, said overcoat comprising a polycarbonate selected from the group consisting of:
   (i) poly[4,4'-isopropylidenediphenylene-co-4,4'-(1-carbamoylethylidene)diphenylene carbonate];
   (ii) poly(4,4'-isopropylidenediphenylene-co-4,4'-[1-(2-carbamoylethyl)ethylidene]diphenylene carbonate);
   (iii) poly(4,4'-isopropylidenediphenylene-co-4,4'-[1-(2-[N-methyl]carbamoylethyl)ethylidene]diphenylene carbonate);
   (iv) poly(4,4'-isopropylidenediphenylene-co-4,4'-[1-(5,5-dimethyltetrahydrofuran-2-one-4-yl)ethylidene]diphenylene carbonate);
   (v) poly(4,4'-isopropylidenediphenylene-co-4,4'-phthalidylidene carbonate); and
   (vi) poly(4,4'-isopropylidenediphenylene-co-1,2-diethyl-1,2-dihydroxyethylene-1,2-di-p-phenylene carbonate).

32. The electrophotographic element of claim 31 wherein said polycarbonate overcoat is cross-linked through its pendant polar groups.

33. The electrophotographic element of claim 31 wherein said polycarbonate overcoat is cross-linked through its pendant polar groups with a cross-linking agent selected from the group consisting of aminoplast resins, formaldehydes, and dialdehydes.

34. An electrophotographic element comprising:
a. an electrically conductive layer;
b. a photoconductive layer as described in claims 1, 2, 3, or 4 superposed on and in electrical contact with said electrically conductive layer; and
c. an overcoat superposed on said photoconductive layer, said overcoat comprising a polycarbonate selected from the group consisting of:
   (i) poly[4,4'-isopropylidenediphenylene-co-4,4'-(1-carbamoylethylidene)diphenylene carbonate];
   (ii) poly(4,4'-isopropylidenediphenylene-co-4,4'-[1-(2-carbamoylethyl)ethylidene]diphenylene carbonate);
   (iii) poly(4,4'-isopropylidenediphenylene-co-4,4'-[1-(2-[N-methyl]carbamoylethyl)ethylidene]diphenylene carbonate);
   (iv) poly(4,4'-isopropylidenediphenylene-co-4,4'-[1-(5,5-dimethyltetrahydrofuran-2-one-4-yl)ethylidene]diphenylene carbonate);
   (v) poly(4,4'-isopropylidenediphenylene-co-4,4'-phthalidylidene carbonate); and
   (vi) poly(4,4'-isopropylidenediphenylene-co-1,2-diethyl-1,2-dihydroxyethylene-1,2-di-p-phenylene carbonate).

35. In an electrophotographic process comprising the steps of:
(a) electrostatically charging a photoconductive layer which is in electrical contact with an electrically conductive layer;
(b) exposing portions of said photoconductive layer to irradiation to form an electrostatic latent image on a surface of said photoconductive layer; and
(c) contacting said surface with a toner composition to form a visible image on said surface, the improvement wherein:
said photoconductive layer comprises a photoconductor and a binder, and said binder comprises a polycarbonate having pendant polar groups attached to from about 1 to 100 percent of the recurring units of said polycarbonate.

36. In an electrophotographic process comprising the steps of:
(a) electrostatically charging an electrophotographic element comprising a photoconductive layer interposed between and in electrical contact with an electrically conductive layer and a protective overcoat;
(b) exposing portions of said electrophotographic element to irradiation to form an electrostatic latent image on a surface of said element; and
(c) contacting said surface with a toner composition to form a visible image on said surface, the improvement wherein:
said overcoat comprises a polycarbonate having pendant polar groups attached to from about 1 to 100 percent of the recurring units of said polycarbonate.

37. In an electrophotographic process comprising the steps of:
(a) electrostatically charging an electrophotographic element comprising a photoconductive layer interposed between and in electrical contact with an electrically conductive layer and a protective overcoat;
(b) exposing portions of said electrophotographic element to irradiation to form an electrostatic latent image on a surface of said element; and
(c) contacting said surface with a toner composition to form a visible image on said surface, the improvement wherein:
said photoconductive layer comprises a photoconductor and a binder, and said binder and said overcoat comprise the same or different polycarbonates having pendant polar groups attached to from about 1 to 100 percent of the recurring units of said polycarbonates.

* * * * *